US012688677B1

(12) United States Patent
Aggarwal et al.

(10) Patent No.: US 12,688,677 B1
(45) Date of Patent: Jul. 21, 2026

(54) SYSTEM FOR DETERMINING BIOMETRIC REPRESENTATION DATA

(71) Applicant: AMAZON TECHNOLOGIES, INC., Seattle, WA (US)

(72) Inventors: Manoj Aggarwal, Seattle, WA (US); Rajeev Ranjan, Seattle, WA (US); Gerard Guy Medioni, Los Angeles, CA (US); Dilip Kumar, Seattle, WA (US); Joshua Engelsma, Jenison, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 728 days.

(21) Appl. No.: 18/061,284

(22) Filed: Dec. 2, 2022

(51) Int. Cl.
*G06V 10/774* (2022.01)
*G06V 40/12* (2022.01)

(52) U.S. Cl.
CPC ........ *G06V 10/774* (2022.01); *G06V 40/1359* (2022.01)

(58) Field of Classification Search
CPC .......................... G06V 10/774; G06V 40/1359
See application file for complete search history.

(56) References Cited

U.S. PATENT DOCUMENTS

| | | | | |
|---|---|---|---|---|
| 10,419,221 | B1 * | 9/2019 | Streit | G06F 21/32 |
| 10,902,237 | B1 * | 1/2021 | Aggarwal | G06V 10/24 |
| 2019/0278895 | A1 * | 9/2019 | Streit | G06V 40/45 |
| 2020/0012904 | A1 * | 1/2020 | Zhao | G06N 3/0455 |
| 2020/0044852 | A1 * | 2/2020 | Streit | G06F 21/32 |
| 2021/0264205 | A1 * | 8/2021 | Ge | G06F 18/2415 |

FOREIGN PATENT DOCUMENTS

| | | | | |
|---|---|---|---|---|
| CN | 112036383 | A | * 12/2020 | G06F 18/214 |
| CN | 113392866 | A | * 9/2021 | G06F 18/214 |

OTHER PUBLICATIONS

"Canny Edge Detection", doxygen, 2 pages. Retrieved from the Internet on Oct. 22, 2020. URL: https://docs.opencv.org/3.4/da/d22/tutorial_py_canny.html.
"MINDTCT", 5 pages. Retrieved from the Internet on Nov. 8, 2022. URL: https://ffpis.sourceforge.net/man/mindtct.html.

* cited by examiner

*Primary Examiner* — Carol W Chan
(74) *Attorney, Agent, or Firm* — Lindauer Law, PLLC

(57) ABSTRACT

A machine learning network is trained to use biometric input data to generate representation data used to assert identity. The network may be trained to consider particular features of interest. For example, the biometric input data may comprise an image of a user's hand. Particular features may comprise one or more of fine print ridges on the hand, principal lines and creases, wrinkles, veins, and so forth. In one implementation intermediate data produced by a first portion of the network is trained to be representative of the particular feature(s) of interest. The resulting representation data, such as produced by a second portion of the network, may thus be based on these features of interest. In another implementation the image is processed to determine feature data, and the image and feature data are provided as input to the network. A hybrid network may also be used.

20 Claims, 9 Drawing Sheets

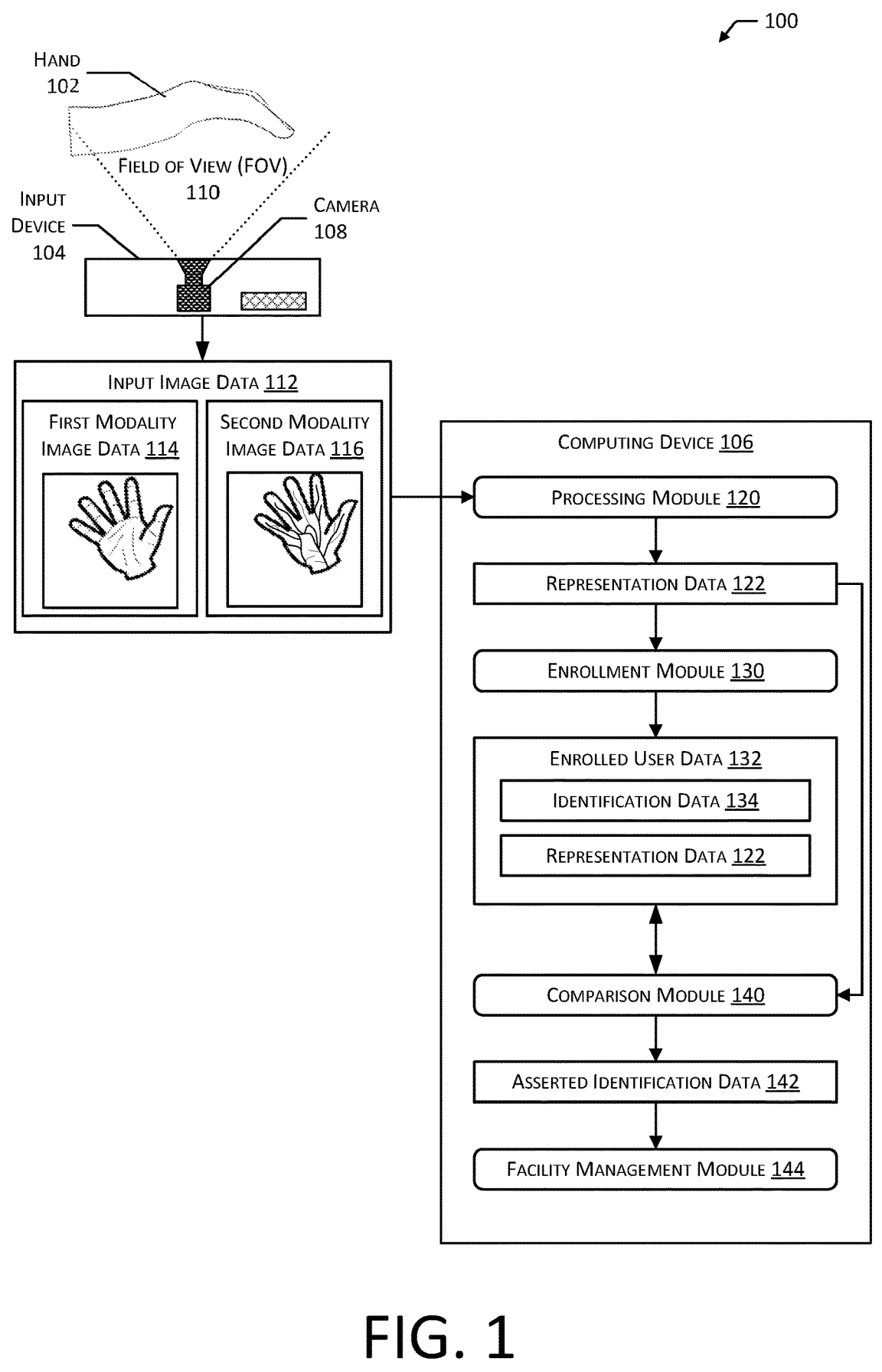

100

HAND
102

FIELD OF VIEW (FOV)
110

INPUT
DEVICE
104

CAMERA
108

INPUT IMAGE DATA 112

FIRST MODALITY
IMAGE DATA 114

SECOND MODALITY
IMAGE DATA 116

COMPUTING DEVICE 106

PROCESSING MODULE 120

REPRESENTATION DATA 122

ENROLLMENT MODULE 130

ENROLLED USER DATA 132

IDENTIFICATION DATA 134

REPRESENTATION DATA 122

COMPARISON MODULE 140

ASSERTED IDENTIFICATION DATA 142

FACILITY MANAGEMENT MODULE 144

FIG. 1

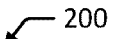
200

TRAINING DATA 202

| TRAINING INPUT IMAGE DATA 220(1) | FEATURE DATA 222(1)(1) | ... | FEATURE DATA 222(1)(P) | LABEL DATA 240(1) | | ... |
|---|---|---|---|---|---|---|
| | | | | SAMPLE ID 242(1) | MODALITY LABEL 244(1) | |

| TRAINING INPUT IMAGE DATA 220(X) | FEATURE DATA 222(X)(1) | ... | FEATURE DATA 222(X)(P) | LABEL DATA 240(X) | | ... |
|---|---|---|---|---|---|---|
| | | | | SAMPLE ID 242(2) | MODALITY LABEL 244(2) | |

FEATURE EXTRACTION MODULE(S) 250
(E.G. MINUTIAE OR OTHER FEATURE OF INTEREST)

| MINUTIAE FEATURE EXTRACTION MODULE 250(1) | CREASE FEATURE EXTRACTION MODULE 250(2) | ... | OTHER FEATURE EXTRACTION MODULE 250(P) |
|---|---|---|---|

| FEATURE DATA 222(1) (e.g. minutiae) | FEATURE DATA 222(2) (e.g. crease) | ... | FEATURE DATA 222(P) |
|---|---|---|---|

TRAINING DATA 202

| TRAINING INPUT IMAGE DATA 220(1) | FEATURE DATA 222(1)(1) | ••• | FEATURE DATA 222(1)(P) | LABEL DATA 240(1) |

PROCESSING MODULE 120
(DURING TRAINING)

REPRESENTATION MODULE 504

TRAINED MODEL DATA 506

•••

NETWORK PORTION(S) 510(B)

•••

NETWORK PORTION(S) 510(N)

REPRESENTATION DATA 122

IDENTITY LOSS FUNCTION MODULE 522

IDENTITY REPRESENTATION LOSS VALUE 524

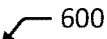
600

INPUT IMAGE DATA
112

PROCESSING MODULE 120
(DURING INFERENCE)

FEATURE EXTRACTION
MODULE(S) 250

MINUTIAE FEATURE
EXTRACTION MODULE
250(1)

CREASE FEATURE
EXTRACTION MODULE
250(2)

· · ·

OTHER FEATURE
EXTRACTION MODULE
250(P)

FEATURE DATA 222(1)
(e.g. minutiae)

FEATURE DATA 222(2)
(e.g. crease)

· · ·

FEATURE DATA 222(P)
(e.g. other)

REPRESENTATION MODULE 504

TRAINED MODEL DATA 506

· · ·

NETWORK PORTION(S) 510(B)

· · ·

NETWORK PORTION(S) 510(N)

REPRESENTATION DATA 122

FIG. 6

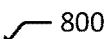

800

INPUT IMAGE DATA
112

PROCESSING MODULE 120
(DURING INFERENCE)

FEATURE EXTRACTION
MODULE(S) 250

MINUTIAE FEATURE
EXTRACTION MODULE
250(1)

CREASE FEATURE
EXTRACTION MODULE
250(2)

· · ·

OTHER FEATURE
EXTRACTION MODULE
250(P)

FEATURE DATA 222(1)
(e.g. minutiae)

FEATURE DATA 222(2)
(e.g. crease)

· · ·

FEATURE DATA 222(P)
(e.g. other)

REPRESENTATION MODULE 704

TRAINED MODEL DATA 706

· · ·

NETWORK PORTION(S) 710(B)

· · ·

NETWORK PORTION(S) 710(N)

REPRESENTATION DATA 122

FIG. 8

SYSTEM FOR DETERMINING BIOMETRIC REPRESENTATION DATA

BACKGROUND

Biometric features may be used to recognize an individual.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 1 illustrates a recognition system that determines representation data representative of features present in image data, according to some implementations.

FIG. 2 illustrates training data and feature extraction modules to determine feature data, according to some implementations.

FIG. 6 illustrates processing using the trained representation module of FIG. 5, according to some implementations.

FIG. 8 illustrates using the trained representation module of FIG. 7, according to some implementations.

Figure 3:
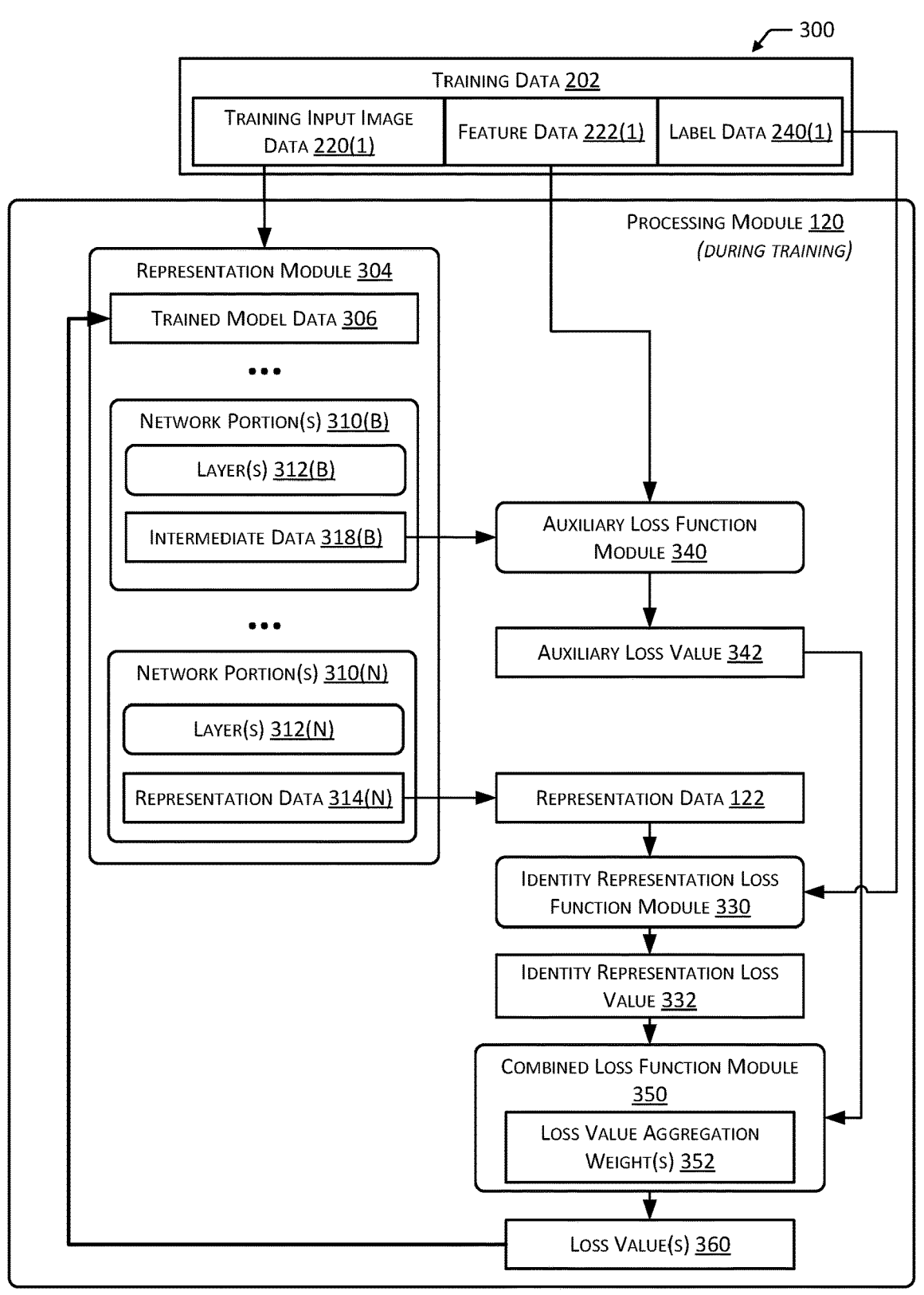
FIG. 3 illustrates training a representation module to consider specified feature data within intermediate data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a materials handling facility (facility), office, transportation facility, or other location may be controlled based on user identity. As the user enters the facility, the user may be identified using the devices and techniques described herein. In another example, a point-of-sale system may use the device and techniques described herein to identify a user and determine a payment account to be used for goods or services.

Traditional systems for identifying users suffer from several significant drawbacks including susceptibility to fraud, lack of speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred.

Biometric input data, such as an image of a hand, may contain different types of features. For example, types of features may include skin friction ridges of a hand, principal lines of the hand, creases of the hand, wrinkles of the skin of the hand, veins of the hand, shape of the hand, and so forth. Some types of features may be decorrelated with other types of features. For example, a pattern of veins in a hand may have a relatively low correlation to minutiae features of friction ridges.

Described in this disclosure are systems and techniques for training machine learning networks and using those trained networks to utilize one or more specified types of features of interest. In some implementations, different types of features may be selected that have minimal correlation between one another or other data that is being processed by the system.

In a first implementation, a first machine learning (ML) network is trained to accept as input image data and provide as output representation data. During training, a portion of the first network is trained to generate intermediate data that is representative of a particular kind of features. For example, during training the intermediate data produced by a first portion of the first network may be trained to represent minutiae features of friction ridges. In some implementations, the intermediate data may comprise a feature map. Continuing the example, during training a second portion of the first network is trained to produce representation data to represent identity. During training, each portion may use respective loss functions to determine respective loss values. Respective weights may be applied to the respective loss values to determine an overall loss value. A greater weight may be assigned to the loss value associated with the representation data than the intermediate data. The overall loss value may then be used to determine trained model data representative of the training. The use of two or more portions during training encourages the first network to take into consideration the type of features represented by the intermediate data while determining the representation data.

In a second implementation, a second ML network is trained to accept as input image data and feature data and provide as output representation data. The feature data may be determined by processing the input image data using a feature extraction module. For example, the input image data may depict a palmar surface of a human hand. A feature extraction module may be used to determine feature data that represents minutiae of the friction ridges depicted in the input image data.

Different combinations of these implementations may be used. In a third implementation, a hybrid variation of the first ML network and the second ML network may be used. In the third implementation, a third ML network is trained to accept as input the input image data and one or more kinds of feature data, with a portion of the third ML network trained to produce intermediate data that is representative of at least one of the one or more kinds of feature data.

The networks may process biometric input data acquired using two or more modalities. For example, the ML networks described herein may be used to process input comprising images obtained using a first modality representing surface features of a hand and a second modality representing subcutaneous features of the hand.

By using the techniques and systems described in this disclosure, a machine learning network may be trained and subsequently used to determine representation data suitable for biometric identification. The trained network may be used to generate representation data based on biometric input. The representation data may be used in various situations, such as enrolling a new user in a biometric identification system, asserting an identity of a user, and so forth.

ILLUSTRATIVE SYSTEM

FIG. 1 illustrates at 100 a recognition system that determines representation data representative of features present in image data, according to some implementations.

A hand 102 of a user is depicted positioned above an input device 104. The input device 104 may include a computing device and a camera 108. The camera 108 has a field of view (FOV) 110. During operation of the input device 104, the camera 108 acquires images of an object in the FOV 110, such as the hand 102, and provides input image data 112. The images may be grayscale, include information about one or more colors or ranges of wavelengths, and so forth. For example, input image data 112 may include information about red, green, blue, violet, near infrared, and so forth. The input image data 112 may be obtained using one or more modalities. The input device 104 may include other components which are not shown. For example, the input device 104 may include lights that illuminate the object in the FOV 110.

In the implementation depicted, the hand 102 is held above the camera 108, with the FOV 110 extending upward. For example, during operation the user may present their hand 102 with the palm or palmar region of the hand 102 toward the input device 104. As a result, the input image data 112 provides an image of the anterior portion of the hand 102. In other implementations, the input image data 112 may include the back of the hand 102. In other implementations, other configurations may be used. For example, the camera 108 may have the FOV 110 extending downwards, and the user may place their hand 102 in the FOV 110 under the input device 104.

The input device 104 is configured to acquire images of the hand 102. The images may be acquired using one or more modalities. In some implementations, images acquired with a first modality may depict features that are close to, or on, a surface of the hand 102 of the user. For example, the first modality features may include friction ridges, creases, wrinkles, scars, dermal papillae ridges, and so forth in at least the epidermis of the hand 102. In one implementation, first modality may acquire images of a surface of the hand 102 in which the hand 102 is illuminated with light having a first polarization and obtained by the camera 108 with a polarizer passing light to the camera 108 that also has the first polarization. In another implementation, the polarizers may be omitted.

In some implementations, images acquired with a second modality may depict features that are below the surface of the hand 102 of the user, such as veins, bones, soft tissue, and so forth. In some implementations, the second modality may acquire images in which the hand 102 is illuminated with light having a second polarization and obtained by the camera 108 with the polarizer passing light to the camera 108 with the first polarization. In another implementation, the polarizers may be omitted.

Some features may be visible in two or more modalities. For example, a crease in the palm may include first modality features on the surface as well as deeper second modality features within the palm.

In some implementations, separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame. In other implementations, single images may include multiple modalities. For example, a single image may be acquired using visible light and infrared light, with the image depicting surface features such as friction ridges and subcutaneous features such as veins.

In the implementation depicted here, the input device 104 does not include a guide, scan plate, or other structure that constrains the pose or position of the hand 102 within the FOV 110. For example, the user may move their hand 102 within the FOV 110 freely, rotating, translating, changing articulation, and so forth without constraint.

In another implementation, the input device 104 may include a structure such as a guide or scan plate to constrain at least some movement of the hand 102. For example, the scan plate may comprise a flat pane of glass which the hand 102 may rest upon, and the camera 108 may then acquire an image.

The system 100 may comprise one or more computing devices 106. The computing device 106 may execute a processing module 120 to receive the input image data 112, perform various operations on the input image data 112, and provide as output representation data 122. The processing module 120 may include preliminary processing, such as applying one or more filters to the input image data 112, performing image alignment, and so forth. For example, the processing module 120 may align images acquired using different modalities, such as aligning the first modality image data 114 and the second modality image data 116. This alignment may include one or more of rotation or translation of a portion of the images.

The processing module 120 may comprise one or more representation modules to determine the representation data 122. The representation module(s) comprise one or more trained machine learning (ML) networks to process the input image data 112 and determine representation data 122. For example, the ML networks may comprise a machine learning system that may utilize a deep learning or convolutional neural network. The representation data 122 is representative of at least some of the information present in the input data. For example, the representation data 122 may comprise an embedding in an embedding space or other values that are descriptive of the features depicted in the input image data 112.

In a first implementation, during training, a portion of a first ML network is trained to generate intermediate data that is representative of a particular kind of features. For example, during training the intermediate data produced by a first portion of the first network may be trained to represent minutiae features of friction ridges. Continuing the example, during training a second portion of the first network is trained to produce representation data 122 to represent identity. During training, each portion may use respective loss functions to determine respective loss values. Respective weights may be applied to the respective loss values to determine an overall loss value. A greater weight may be assigned to the loss value associated with the representation data than the intermediate data. The overall loss value may then be used to determine trained model data representative of the training. The use of two or more portions during training encourages the first network to take into consideration the type of features represented by the intermediate data while determining the representation data 122. This implementation is discussed with regard to FIGS. 3 and 4.

In a second implementation, a second ML network is trained to accept as input the input image data 112 and feature data, and provide as output the representation data 122. The feature data may be determined by processing the input image data 112 using a feature extraction module. For example, the input image data 112 may depict a palmar surface of the hand 102. A feature extraction module may be used to determine feature data that represents minutiae of the friction ridges depicted in the input image data 112. This implementation is discussed with regard to FIGS. 5 and 6.

Different combinations of these implementations may be used. In a third implementation, a hybrid variation of the first ML network and the second ML network may be used. In the third implementation, a third ML network is trained to accept as input the input image data 112 and one or more kinds of feature data, with a portion of the third ML network trained to produce intermediate data that is representative of at least one of the one or more kinds of feature data. This implementation is discussed with regard to FIGS. 7 and 8.

A user enrollment module 130 may determine enrolled user data 132 that comprises the representation data 122 that is associated with the enrollment process, as well as information such as a user identifier, name, and so forth. The representation data 122 may act as a "signature" that is uniquely associated with the identity of the user.

During an enrollment process, the user may opt in to use the system 100. In one implementation during the enrollment process, the user may present their hand 102. Additional identification data 134 may be obtained from the user, such as name, contact information, demographic data, payment account information, and so forth. An identity of a particular user may be associated with the representation data 122. During subsequent usage, the user may present their hand 102 at an input device 104. The resulting query input image data 112 may be processed by a comparison module 140 to determine if the representation data 122 corresponds to previously stored enrolled user data 132. For example, the input image data 112 may be processed by the processing module 120 to determine representation data 122. During the enrollment process the comparison module 140 may be used to determine whether the user has been previously enrolled.

During use of the system 100 to determine an identity associated with a hand 102 presented at the input device 104, a comparison module 140 may be used to compare the representation data 122 associated with the input image data 112 of the unidentified user with the representation data 122 in the enrolled user data 132 to determine asserted identification data 142.

A confidence value may be determined that is indicative of similarity between one or more of the representation data 122 associated with the unidentified user and representation data 122 for enrolled users stored in the enrolled user data 132. For example, the confidence value may be determined based on a first Euclidean distance in the vector space between representation data 122(1) from the input image data 112 of the unidentified user and the previously stored representation data 122(2) in the enrolled user data 132. In other implementations, other techniques may be used to compare the representation data 122 of an unidentified user, or a user for whom identity is to be confirmed, with previously stored data.

During operation of the comparison module 140, a user identifier that is associated with the representation data 122 of the unidentified user that is most similar to the enrolled user data 132 may be determined to be the identity of the user. For example, the user identifier associated with the closest representation data 122 in the enrolled user data 132 may be associated with the user who presented their hand 102.

The asserted identification data 142 may provide information such as one or more of a user identifier associated with the user, a location or identification of the input device 104, data indicative of date and time that the input image data 112 was obtained, and so forth. The asserted identification data 142 may be subsequently used for various purposes. For example, if the user has been granted access to the facility, a command may be issued to open a gate or door so the user may enter the facility. In another example, the asserted identification data 142 may be used to determine a payment account or other credentials associated with the user which may then be used in a financial transaction. In yet another example, the asserted identification data 142 may be passed to a facility management module 144.

The facility management module 144 may use the asserted identification data 142 to associate an identity with that user as they move about the facility. For example, the facility management module 144 may use data from cameras or other sensors in the environment to determine a location of the user. Given a known path of the user from the gate, the user identity indicated in the asserted identification data 142 may be associated with the user as they use the facility. For example, the now identified user may walk to a shelf, remove an item, and leave the facility. The facility management module 144 may determine the interaction data indicative of the removal of the item as being associated with the user identifier specified in the asserted identification data 142, and bill an account associated with the user identifier.

The systems and techniques described above are discussed with respect to images of human hands. These systems and techniques may be used with respect to other forms of data, other kinds of objects, and so forth.

FIG. 2 illustrates at 200 training data 202 and feature extraction modules 250 to determine feature data 222, according to some implementations. The preparation of training data 202 may be implemented by one or more computing devices 106. Training data 202 may be used to train representation modules in the processing module 120, with that training expressed as trained model data.

Training data 202 is shown. The training data 202 may comprise one or more of training input image data 220, training feature data 222, and associated label data 240. The training input image data 220 may comprise actual or synthetic data. For example, training input image data 220 may have been acquired from individuals who have opted in to provide training data. In one implementation, the training data 202 may exclude individuals who have enrolled to use of the system for identification. In another implementation, some enrolled users may opt in to explicitly permit input image data 112 obtained during enrollment to be stored as training input image data 220 for later training.

Synthetic data may comprise training input image data 220 that is created. For example, a generative adversarial network (GAN) may be used to create synthetic training input image data 220.

In some implementations, each instance of training input image data 220 may be associated with one or more instances of training feature data 222(1), . . . , 222(P). Each instance of feature data 222 may be associated with a particular type of feature, as described next.

The feature data 222 comprises information associated with at least one type of features. Biometric input data, such as an image of the hand 102, may contain different types of features. For example, types of features may include skin friction ridges of a hand, principal lines of the hand 102, creases of the hand 102, wrinkles of the skin of the hand 102, veins of the hand 102, shape of the hand 102, and so forth. Some types of features may be decorrelated with other types of features. For example, a pattern of veins in the hand 102 may have a relatively low correlation to minutiae features of friction ridges.

One or more feature modules 250(1), 250(2), . . . , 250(P) may be used to determine feature data 222. The feature modules 250 may comprise a previously trained ML network, utilize one or more deterministic algorithms, and so forth.

In the implementation shown here, a minutiae feature extraction module 250(1) may accept image data, such as input image data 112 or training input image data 220, and provide as output feature data 222(1) that is representative of minutiae depicted in the image data. For example, the minutiae feature module 250(1) may implement at least a portion of the "mindtct" algorithm as promulgated by the National Institute of Standards and Technology (NIST) to detect minutiae present in image data. In other examples, other algorithms or networks may be used.

A crease feature extraction module 250(2) may accept as input image data, such as input image data 112 or training input image data 220, and provide as output feature data 222(2) that is representative of creases of the hand 102 depicted in the image data. For example, the crease feature extraction module 250(2) may implement a Canny edge detector. In other examples, other algorithms or networks may be used.

Other feature modules 250(P) may also be provided that accept as input image data, such as input image data 112 or training input image data 220, and provide as output feature data 222(P) that is representative of at least one type of feature. For example, a principal lines algorithm may be used to detect principal lines of the hand 102 as depicted in the input image.

The label data 240 may comprise information such as a sample identifier (ID) 242, modality label 244, and so forth. The sample identifier 242 may be used to distinguish instances of training input image data 220 that have been obtained from different hands 102. The modality label 244 may comprise information indicative the modality used to acquire, or synthesize, the associated training input image data 220.

FIG. 3 illustrates at 300 training a first implementation of a representation module to consider specified feature data within intermediate data, according to some implementations. The operations described with regard to this figure may be implemented by one or more computing devices 106.

The processing module 120 may comprise a representation module 304 that accepts as input image data, such as the training input image data 220 during training. The representation module 304 may comprise a ML network, such as a deep learning network. During training, the representation module 304 determines trained model data 306. The trained model data 306 may comprise weights, bias values, or other information associated with operation of the representation module 304. For example, the trained model data 306 may comprise weight associated with particular nodes within the ML network.

During training, the representation module 304 may comprise one or more network portions 310(1), 310(B), . . . , 310(N). In one implementation, each set of network portions 310 may comprise one or more layers 312. The layers 312 may comprise one or more of encoder layers, convolutional layers, pooling layers, connected layers, readout layers, decoder layers, deconvolutional layers, and so forth. For example, encoder layers may determine representation data 314, decoder layers may determine intermediate data 318, and so forth.

In some implementations the representation data 314 may comprise information that is based on the input to the network portion 310 and is representative of that input. The dimensionality of the representation data 314 may differ from the dimensionality of the input. For example, the training input image data 220 may comprise an image that is 4096×4096 pixels with 16 bits per pixel of data while the representation data 314 may comprise a 128 dimension vector value.

In some implementations the intermediate data 318 comprises information associated with one or more layers 312. For example, the intermediate data 138 may comprise the output of a deconvolution portion after processing the representation data 314, or other intermediate data. The dimensionality of the intermediate data 318 may be the same or may differ from the dimensionality of the input to the network portions 310 or the deconvolution portion therein.

In some implementations, one or more of the representation data 314 or the intermediate data 318 from one set of network portions 310 may be provided as input to another portion of the network. The network may comprise additional layers or modules not shown.

During training of the representation module 304, the first portion of the network, such as the first set of network portions 310(B) may be trained to determine intermediate data 318 data that corresponds to a particular type of feature data 222. For example, if the feature data 222(1) is associated with minutiae, the first portion of the network may be trained to detect minutiae. During training, an auxiliary loss function module 340 uses a first loss function to process the intermediate data 318(B) and the feature data 222(1) to determine an auxiliary loss value 342. For example, the auxiliary loss value 342 may be indicative of differences between the intermediate data 318(B) and the corresponding feature data 222(1). For ease of illustration, and not necessarily as a limitation, a single instance of intermediate data 318 and associated auxiliary loss function module 340 and auxiliary loss value 342 are depicted. In other implementations additional intermediate data 318, auxiliary loss function modules 340, and auxiliary loss values 342 may be utilized to facilitate training for a plurality of types of feature data 222.

During training of the representation module 304, the second portion of the network, such as the second set of network portions 310(N) may be trained to determine representation data 314(N) that is suitable for identification. In some implementations, the representation data 314(N) may be deemed to be representation data 122 and may be provided as input to an identity representation loss function module 330. During training, the identity representation loss function module 330 may use a second loss function to determine an identity representation loss value 332. For example, the identity representation loss value 332 may be indicative of differences between the representation data 314 and the corresponding label data 240 such as sample ID 242.

As described above, the representation module 304 is trained to determine representation data 122 that is suitable for distinguishing biometric input data associated with one user from that of another user. By utilizing the first portion of the network and the second portion of the network during training, it is possible to train the representation module 304 to "pay attention" or consider particular types of features specified by the feature data 222. The degree to which the types of features are considered during training may be specified using one or more loss value aggregation weights 352.

A combined loss function module 350 may accept as input the identity representation loss value 332 and the auxiliary loss value 342. An (overall) loss value 360 may then be determined based on these inputs. In some implementations, the auxiliary loss value 342 and the identity representation loss value 332 may be normalized to a common range of values. For example, the loss values may be normalized to a range of 0 to 1.

The loss value aggregation weights 352 may specify a weighting to be applied to one or more of the loss values provided as input to the combined loss function module 350. For example, loss value aggregation weights 352 may comprise a first weight associated with the auxiliary loss value 342 and a second weight associated with the identity representation loss value 332. In some implementations, the first weight value may be less than the second weight value. For example, the first weight value may be "0.10" while the second weight value may be "0.90". In other implementations, such as if the loss values utilize different numerical ranges for their respective values, the first weight value may be greater than the second weight value. During training, the weights may result in the representation module 304 providing more weight with learning the representation data 314, compared to the intermediate data 318 representing a particular type of feature.

During training, the processing module 120 may perform many iterations of the operations described with respect to this figure. For example, the training data 202 may comprise thousands of images that may be subsequently processed. Over time, using machine learning techniques, the trained model data 306 is determined that embodies the results of this training. Once trained, the representation module 304 may be used for inference as described next.

Figure 4:
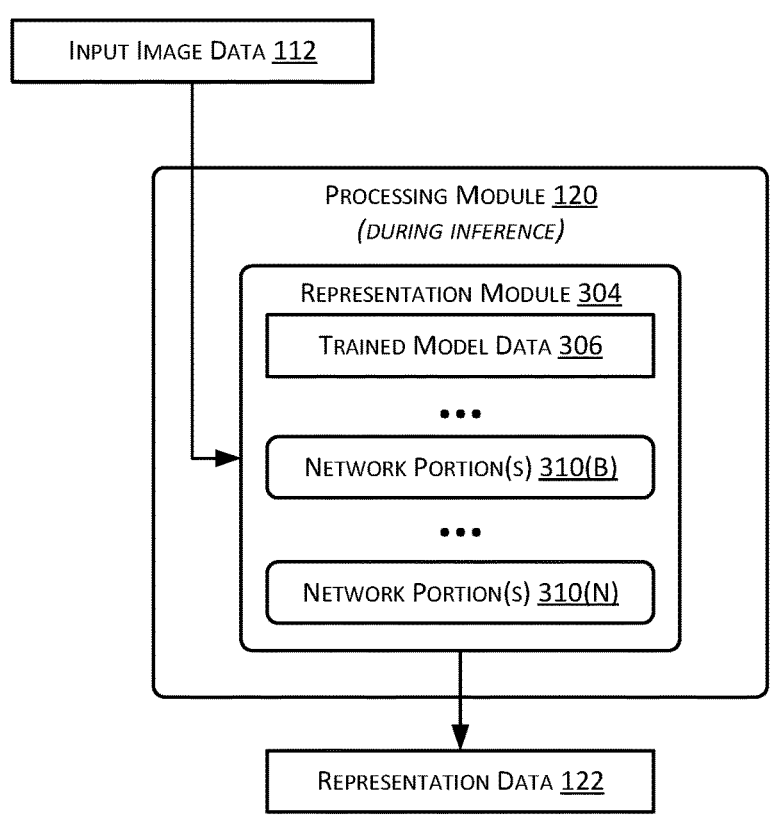
FIG. 4 illustrates using the representation module of FIG. 3 during inference, according to some implementations.

FIG. 4 illustrates at 400 using the representation module 304 of FIG. 3 during inference, according to some implementations. The operations described with regard to this figure may be implemented by one or more computing devices 106.

Once training is complete, the results of the training are embodied within the trained model data 306 that is used to operate the representation module 304. Some portions of the processing module 120 are not used once training is complete and may be omitted from the representation module

304. For example, the auxiliary loss function module 340, the identity representation loss function module 330, and the combined loss function module 350 are not used during inference and may be omitted. In some implementations, other portions of the representation module 304 may be omitted during inference. For example, if the representation data 314(N) produced by the second portion of the network comprising the network portions 310(N) is used as the representation data 122, the deconvolution portion may be omitted.

The trained representation module 304 accepts as input the input image data 112 and provides as output the representation data 122. The representation data 122 may be used by other modules, such as the enrollment module 130, the comparison module 140, and so forth.

Figure 5:
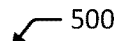
FIG. 5 illustrates training a representation module to consider initial input comprising an input image and specified feature data, according to some implementations.

FIG. 5 illustrates at 500 training a second representation module to consider initial input comprising an input image and specified feature data, according to some implementations. The operations described with regard to this figure may be implemented by one or more computing devices 106.

The processing module 120 may comprise a representation module 504 that accepts as input image data, such as the training input image data 220, and one more types of associated feature data 222(1)-(P) during training. The representation module 504 may comprise a ML network, such as a deep learning network. During training, the representation module 504 determines trained model data 506. The trained model data 506 may comprise weights, bias values, or other information associated with operation of the representation module 504. For example, the trained model data 506 may comprise weight associated with particular nodes within the ML network.

During training the representation module 504 may comprise one or more network portions 510(1), 510(B), . . . , 510(N). In one implementation, each set of network portions 510 may comprise one or more layers that perform convolutional operations to generate representation data, layers that deconvolve the representation data to determine intermediate data, and so forth.

In some implementations the layers 312 may comprise one or more of a convolution portion (or encoder) or a deconvolution portion (or decoder). The dimensionality of the representation data 122 may differ from the dimensionality of the input. For example, the training input image data 220 may comprise an image that is 4096×4096 pixels with 16 bits per pixel of data while the representation data 122 may comprise a 128 dimension vector value.

During training of the representation module 504 the network comprising one or more sets of network portions 510 may be trained to determine representation data 122 that is suitable for identification. In some implementations, the representation data 122 may be provided as input to an identity loss function module 522. During training, the identity loss function module 522 may use a loss function to determine an identity representation loss value 524. For example, the identity representation loss value 524 may be indicative of differences between the representation data 122 and the corresponding label data 240 such as sample ID 242.

As described above, the representation module 504 is trained to determine representation data 122 that is suitable for distinguishing biometric input data associated with one user from that of another user. By explicitly providing as input the training input image data 220 as well as corresponding training feature data 222 for one or more types of features, the resulting utility of the representation data 122 to distinguish between users may be improved. For example, during training, types of feature data 222 may be selected that are at least partially decorrelated with respect to one another, the training input image data 220, and so forth.

During training, the processing module 120 may perform many iterations of the operations described with respect to this figure. For example, the training data 202 may comprise thousands of images that may be subsequently processed. Over time, using machine learning techniques, the trained model data 506 is determined that embodies the results of this training. Once trained, the representation module 504 may be used for inference as described next.

FIG. 6 illustrates at 600 using the trained representation module 504 of FIG. 5 during inference, according to some implementations. The operations described with regard to this figure may be implemented by one or more computing devices 106.

Once training is complete, the results of the training are embodied within the trained model data 506 that is used to operate the representation module 504. Some portions of the processing module 120 are not used once training is complete and may be omitted from the representation module 504. For example, the identity loss function module 522 is not used during inference and may be omitted. In some implementations, other portions of the representation module 504 may be omitted during inference.

During inference, the input image data 112 is processed by one or more feature extraction modules 250 associated with the feature data 222 used during training to determine respective feature data 222. For example, the input image data 112 may be processed using the minutiae feature extraction module 250(1) to determine feature data 222(1) representative of the minutia type of features. Continuing the example, the input image data 112 may be processed using the crease feature extraction module 250(2) to determine feature data 222(2) representative of the crease type of features. Further continuing the example, the input image data 112 may be processed using the other feature extraction module 250(P) to determine feature data 222(P) representative of another type of features, such as wrinkles, veins, and so forth.

The trained representation module 504 accepts as input the input image data 112 and associated feature data 222 (1)-(P) and provides as output the representation data 122. The representation data 122 may be used by other modules, such as the enrollment module 130, the comparison module 140, and so forth.

Figure 7:
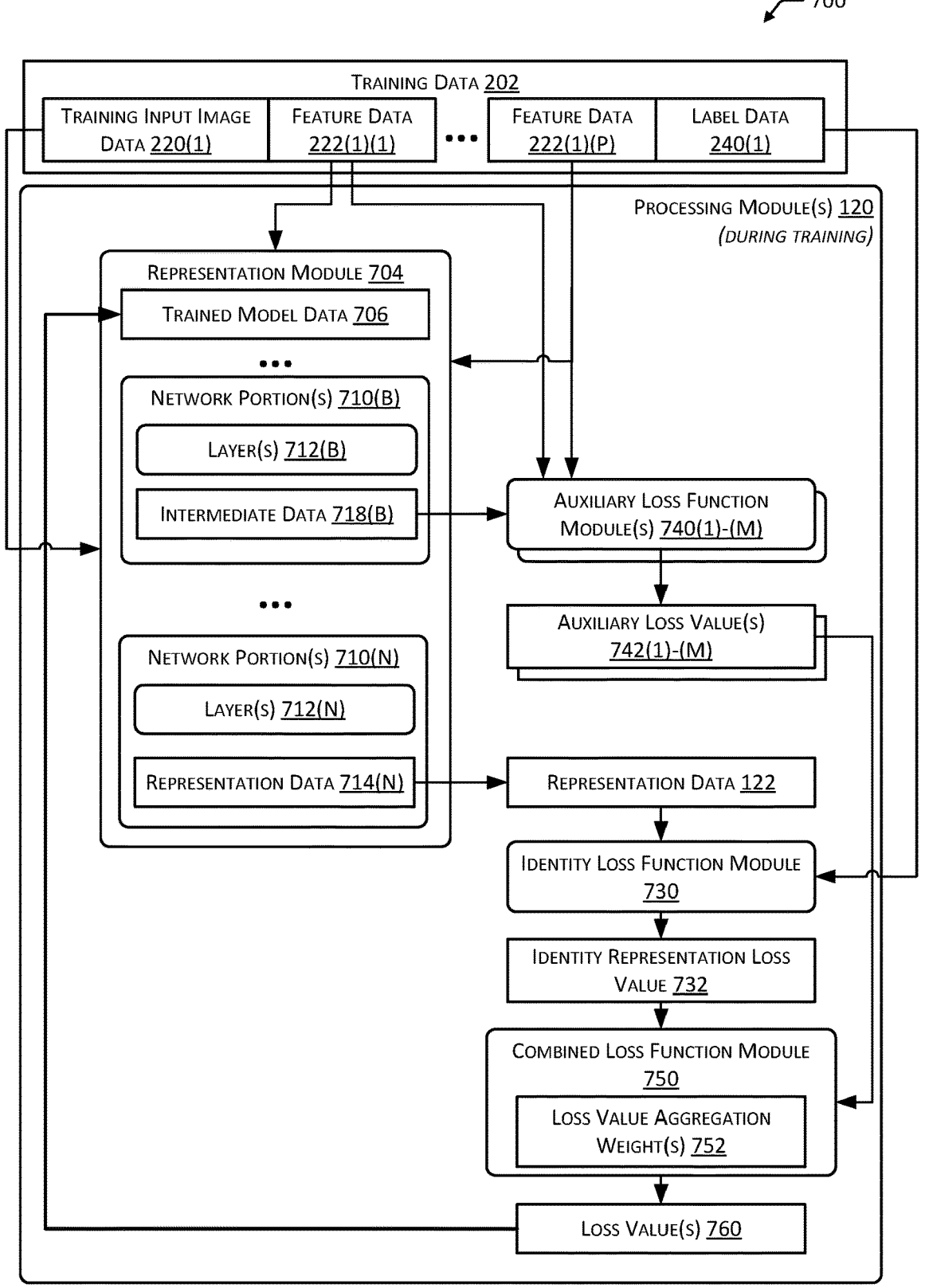
FIG. 7 illustrates training a hybrid representation module, according to some implementations.

FIG. 7 illustrates at 700 training a hybrid representation module, according to some implementations. The operations described with regard to this figure may be implemented by one or more computing devices 106. The hybrid representation module depicted combines the implementations depicted with regard to FIGS. 3 and 5, utilizing training input image data 220 and feature data 222 as input to the representation module 704 during training, as well as training utilizing one or more instances of intermediate data 718 to be representative of one or more types of feature data 222.

The processing module 120 may comprise a representation module 704 that accepts training input image data 220 and one or more types of feature data 222(1)-(P) during training. The representation module 704 may comprise a ML network, such as a deep learning network. During training, the representation module 704 determines trained model data 706. The trained model data 706 may comprise weights, bias values, or other information associated with operation of the representation module 704. For example, the trained model data 706 may comprise weight associated with particular nodes within the ML network.

During training the representation module 704 may comprise one or more network portions 710(1), 710(B), . . . , 710(N). In one implementation, each set of network portions 710 may comprise one or more layers 712. The layers 712 may comprise one or more of encoder layers, convolutional layers, pooling layers, connected layers, readout layers, decoder layers, deconvolutional layers, and so forth. For example, encoder layers may determine representation data 714, decoder layers may determine intermediate data 718, and so forth. Additional network portions 710 (not shown) may determine respective instances of intermediate data 718.

In some implementations the layers 712 may comprise one or more of an encoder or a decoder. The representation data 714 may comprise information that is based on the input to the network portion 710 and is representative of that input. The dimensionality of the representation data 714 may differ from the dimensionality of the input. For example, the training input image data 220 may comprise an image that is 4096×4096 pixels with 16 bits per pixel of data while the representation data 714 may comprise a 128 dimension vector value.

The intermediate data 718 may comprise the output of a layer 712 such as a deconvolution portion, after processing the representation data 714, or other data. The dimensionality of the intermediate data 718 may be the same or may differ from the dimensionality of the input to the network portions 710, or the layers 712 therein.

In some implementations, one or more of the representation data 714 or the intermediate data 718 from one set of network portions 710 may be provided as input to another portion of the network. The network may comprise additional layers or modules not shown.

During training of the representation module 704, the first portion of the network, such as the first set of network portions 710(B) may be trained to determine intermediate data 718 data that corresponds to a particular type of feature data 222. For example, if the feature data 222(1) is associated with minutiae, the first portion of the network may be trained to detect minutiae. During training, an auxiliary loss function module 740 uses a first loss function to process the intermediate data 718(B) and the feature data 222(1) to determine an auxiliary loss value 742. For example, the auxiliary loss value 742 may be indicative of differences between the intermediate data 718(B) and the corresponding feature data 222(1). Additional portions of the network, and corresponding additional instances of intermediate data 718 (M) and auxiliary loss function modules 740(M) may also be utilized during training.

During training of the representation module 704, the second portion of the network, such as the second set of network portions 710(N) may be trained to determine representation data 714(N) that is suitable for identification. In some implementations, the representation data 714(N) may be deemed to be representation data 122 and may be provided as input to an identity loss function module 730. During training, the identity loss function module 730 may use a second loss function to determine an identity representation loss value 732. For example, the identity representation loss value 732 may be indicative of differences between the representation data 714 and the corresponding label data 240 such as sample ID 242.

As described above, the representation module 704 is trained to determine representation data 122 that is suitable for distinguishing biometric input data associated with one user from that of another user. By utilizing the first portion of the network, the second portion of the network, and additional portions of the network in other implementations during training, it is possible to train the representation module 704 to "pay attention" or consider particular types of features specified by the feature data 222. The degree to which the types of features are considered during training may be specified using one or more loss value aggregation weights 752.

A combined loss function module 750 may accept as input the identity representation loss value 732 and the auxiliary loss value(s) 742(1)-(M). An (overall) loss value 760 may then be determined based on these inputs. In some implementations, the auxiliary loss value 342 and the identity representation loss value 332 may be normalized to a common range of values. For example, the loss values may be normalized to a range of 0 to 1.

The loss value aggregation weights 752 may specify a weighting to be applied to one or more of the loss values provided as input to the combined loss function module 750. For example, loss value aggregation weights 752 may comprise a first weight associated with the first auxiliary loss value 742(1), a second weight associated with and a second auxiliary loss value 742(2), a third weight associated with the identity representation loss value 732, and so forth. In some implementations, the weight value associated with the identity representation loss value 732 may exceed a combined sum of the weights associated with the auxiliary loss values 742. For example, the first weight value may be "0.05", the second weight value may be "0.10" while the third weight value may be "0.85". In other implementations, such as if the loss values utilize different numerical ranges for their respective values, the first weight value may be greater than the second weight value. During training, this results in the representation module 704 providing more weight with learning the representation data 714, compared to the intermediate data 718(M) representing their respective types of features.

During training, the processing module 120 may perform many iterations of the operations described with respect to this figure. For example, the training data 202 may comprise thousands of images that may be subsequently processed. Over time, using machine learning techniques, the trained model data 706 is determined that embodies the results of this training. Once trained, the representation module 704 may be used for inference as described next.

FIG. 8 illustrates at 800 using the trained representation module 704 of FIG. 7, according to some implementations. The operations described with regard to this figure may be implemented by one or more computing devices 106.

Once training is complete, the results of the training are embodied within the trained model data 706 that is used to operate the representation module 704. Some portions of the processing module 120 are not used once training is complete and may be omitted from the representation module 704. For example, the identity loss function module 730 is not used during inference and may be omitted. In some implementations, other portions of the representation module 704 may be omitted during inference.

During inference, the input image data 112 is processed by one or more feature extraction modules 250 associated with the feature data 222 used during training to determine respective feature data 222. For example, the input image data 112 may be processed using the minutiae feature extraction module 250(1) to determine feature data 222(1) representative of the minutia type of features. Continuing the example, the input image data 112 may be processed using the crease feature extraction module 250(2) to determine feature data 222(2) representative of the crease type of features. Further continuing the example, the input image data 112 may be processed using the other feature extraction module 250(P) to determine feature data 222(P) representative of another type of features, such as wrinkles, veins, and so forth.

The trained representation module 704 accepts as input the input image data 112 and associated feature data 222 (1)-(P), and provides as output the representation data 122. The representation data 122 may be used by other modules, such as the enrollment module 130, the comparison module 140, and so forth.

Figure 9:
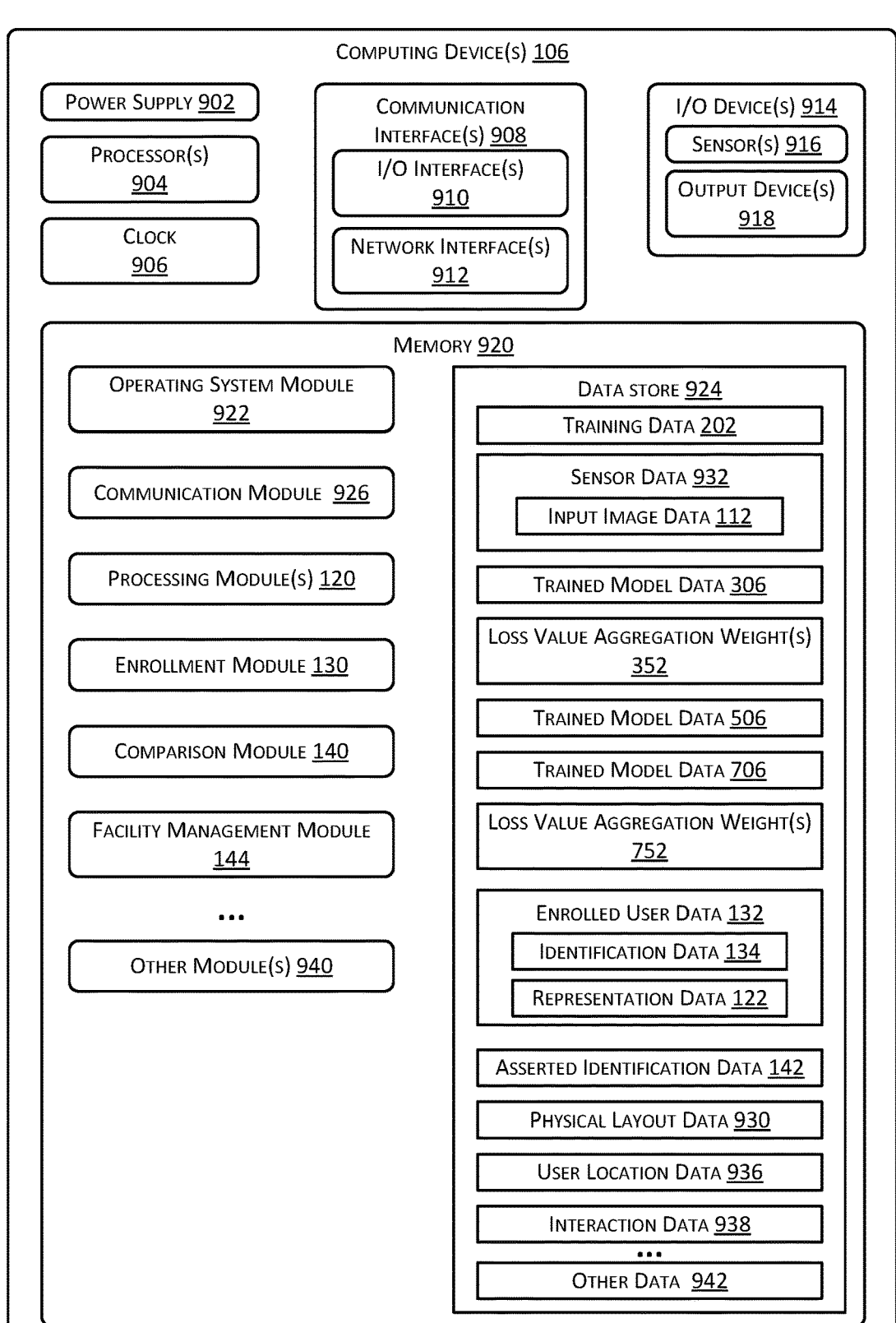
FIG. 9 is a block diagram of a computing device to execute the recognition system, according to some implementations.

FIG. 9 is a block diagram at 900 of a computing device 106 to execute the recognition system, according to some implementations. The computing device 106 may be within the input device 104, may comprise a server, and so forth. The computing device 106 may be physically present at the facility, may be accessible by a network, or a combination of both. The computing device 106 does not require end-user knowledge of the physical location and configuration of the system that delivers the services. Common expressions associated with the computing device 106 may include "embedded system", "on-demand computing", "software as a service (Saas)", "platform computing", "network-accessible platform", "cloud services", "data centers", and so forth. Services provided by the computing device 106 may be distributed across one or more physical or virtual devices.

One or more power supplies 902 may be configured to provide electrical power suitable for operating the components in the computing device 106. The one or more power supplies 902 may comprise batteries, capacitors, fuel cells, photovoltaic cells, wireless power receivers, conductive couplings suitable for attachment to a power source such as provided by an electric utility, and so forth. The computing device 106 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The computing device 106 may include one or more communication interfaces 908 such as input/output (I/O) interfaces 910, network interfaces 912, and so forth. The communication interfaces 908 enable the computing device 106, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 916, keyboard, mouse, scanner, and so forth. The I/O devices 914 may also include output devices 918 such as one or more of a display device, printer, audio speakers, and so forth. In some embodiments, the I/O devices 914 may be physically incorporated with the computing device 106 or may be externally placed.

The network interfaces 912 may be configured to provide communications between the computing device 106 and other devices, such as scanners 104, routers, access points, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, Zig-Bee, and so forth.

The computing device 106 may also include one or more buses or other internal communications hardware or software that allow for the transfer of data between the various modules and components of the computing device 106.

As shown in FIG. 9, the computing device 106 includes one or more memories 920. The memory 920 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 920 provides storage of computer-readable instructions, data structures, program modules, and other data for the operation of the computing device 106. A few example functional modules are shown stored in the memory 920, although the same functionality may alternatively be implemented in hardware, firmware, or as a system on a chip (SoC).

The memory 920 may include at least one operating system (OS) module 922. The OS module 922 is configured to manage hardware resource devices such as the I/O interfaces 910, the I/O devices 914, the communication interfaces 908, and provide various services to applications or modules executing on the processors 904. The OS module 922 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 920 may be a data store 924 and one or more of the following modules. These modules may be executed as foreground applications, background tasks, daemons, and so forth. The data store 924 may use a flat file, database, linked list, tree, executable code, script, or other data structure to store information. In some implementations, the data store 924 or a portion of the data store 924 may be distributed across one or more other devices including the computing devices, network attached storage devices, and so forth.

A communication module 926 may be configured to establish communications with one or more of the scanners 104, sensors 916, display devices, other computing devices, or other devices. The communications may be authenticated, encrypted, and so forth.

The memory 920 may also store one or more of the processing module 120, the enrollment module 130, or the comparison module 140, as described above. Information used by these modules may be stored in the data store 924. For example, the data store 924 may be used to store one or more of sensor data 932 comprising the input image data 112, the trained model data 306, the loss value aggregation weights 352, the trained model data 506, the trained model data 706, the loss value aggregation weights 752, the enrolled user data 132, the asserted identification data 142, and so forth.

The memory 920 may store the facility management module 144. The facility management module 144 may perform various functions, such as tracking items between different inventory locations, to and from carts, generating restocking orders, directing operation of robots within the facility, using the asserted identification data 142 to associate a particular user identity with a user in the facility, and so forth. During operation, the facility management module

144 may access sensor data 932 such as one or more of image data from cameras, weight data from weight sensors, and so forth.

Information used by the facility management module 144 may be stored in the data store 924. For example, the data store 924 may be used to store physical layout data 930, sensor data 932, asserted identification data 142, user location data 936, interaction data 938, and so forth.

The physical layout data 930 may provide information indicative of where scanners 104, cameras, weight sensors, antennas for radio receivers, inventory locations, and so forth are in the facility with respect to one another. For example, the physical layout data 930 may comprise information representative of a map or floor plan of the facility with relative positions of gates with scanners 104 and inventory locations.

The sensor data 932 may comprise information obtained from one or more of the sensors 916 in or associated with the facility.

The enrolled user data 132 may comprise the identification data 134 and associated representation data 122 for previously enrolled user accounts. For example, the enrolled user data 132 may comprise first identification data 134 indicative of "Bob" that is associated with first representation data 122, second identification data 134 indicative of "Pat" that is associated with second representation data 122, and so forth.

The facility management module 144 may generate the user location data 936 that is indicative of the location of the user within the facility. For example, the facility management module 144 may use image data obtained by the cameras to determine a location of the user. In other implementations, other techniques may be used for determining the user location data 936. For example, data from a smart floor may be used to determine the location of the user.

A user identity may be associated with user location data 936 based on the asserted identification data 142. For example, the user enters the facility and has their palm scanned, producing asserted identification data 142 that is indicative of their time of entry, an input device 104 associated with where they entered, and their user identifier. The user location data 936 indicative of a path of a user that begins at the input device 104 at the time of entry may be associated with the user identifier in the asserted identification data 142.

Based on the user location data 936 and the interaction data 938, a particular interaction may be associated with an account of a particular user. For example, if the user location data 936 indicates that the user is present in front of inventory location 492 at time 17:47:20 and the interaction data 938 indicates a pick of a quantity of one item from an area on inventory location 492 at 17:47:27, the user may be billed for that pick.

The facility management module 144 may use the sensor data 932 to generate the interaction data 938. The interaction data 938 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 144 may generate interaction data 938 that indicates what item the user picked from a particular lane on a shelf, and then use this interaction data 938 to adjust the count of inventory stowed at that lane. The interaction data 938 may then be used to bill an account associated with the user identifier that is associated with the user who picked the item.

The facility management module 144 may process the sensor data 932 and generate output data. For example, based on the interaction data 938, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 940 may also be present in the memory 920 as well as other data 942 in the data store 924. For example, a billing module may use the interaction data 938 and the asserted identification data 142 to bill an account associated with a particular user.

The devices and techniques described in this disclosure may be used in a variety of other settings. For example, the system may be used in conjunction with a point-of-sale (POS) device. The user may present their hand 102 to an input device 104 to provide an indication of intent and authorization to pay with an account associated with the asserted identification data 142. In another example, a robot may incorporate an input device 104. The robot may use the asserted identification data 142 to determine whether to deliver a parcel to the user, and based on the asserted identification data 142, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more memory devices storing first computer-executable instructions; and one or more hardware processors to execute the first computer-executable instructions to:

determine a first set of training data comprising first training input image data, associated first training feature data, and associated label data, wherein:

the associated first training feature data comprises at least:

first information associated with a first type of feature of an object depicted in the first training input image data, and second information associated with a second type of feature of the object depicted in the first training input image data;

provide the first training input image data as input to a first machine learning network ("first network");

determine, based on the first training input image data and using a first portion of the first network, first intermediate data, wherein the first intermediate data corresponds to respective types of feature data;

determine, based on the first intermediate data and the associated first training feature data, a first loss value using a first loss function;

determine, based on the first training input image data and using a second portion of the first network, first representation data;

determine, based on the first representation data and the associated label data, a second loss value using a second loss function;

determine a first weight associated with the first loss value;

determine a second weight associated with the second loss value;

determine a third loss value based on the first loss value, the first weight, the second loss value, and the second weight;

determine trained model data based at least in part on the third loss value, wherein the trained model data is associated with operation of the first portion and the second portion of the first network;

acquire second input image data;

determine second representation data, based on using the first network and the trained model data to process the second input image data; and use the second representation data to perform one or more of:

determine enrollment user data, or determine asserted identification data.

2. The system of claim 1, the one or more hardware processors to further execute the first computer-executable instructions to:

normalize the first loss value and the second loss value to a common range; and wherein the first weight is less than the second weight.

3. The system of claim 1, wherein the associated first training feature data and the first intermediate data are representative of one or more of:

skin friction ridges of a hand, principal lines of the hand, creases of the hand, wrinkles of skin of the hand, veins of the hand, or shape of the hand.

4. The system of claim 1, the one or more hardware processors to further execute the first computer-executable instructions to:

process the first training input image data using a feature extraction module to determine the associated first training feature data.

5. The system of claim 1, wherein:

the enrollment user data comprises previously stored representation data that is associated with identification data; and the asserted identification data is determined based on a comparison of the second representation data and the previously stored representation data.

6. The system of claim 1, the one or more hardware processors to further execute the first computer-executable instructions to:

provide the associated first training feature data as input to the first network;

wherein the first portion of the first network determines the first intermediate data further based on the associated first training feature data; and wherein the second portion of the first network determines the first representation data further based on the associated first training feature data.

7. The system of claim 1, wherein the first training input image data and the associated first training feature data are associated with a first modality; and the first set of training data further comprising:

second training input image data associated with a second modality; and second training feature data associated with the second modality; and the one or more hardware processors to further execute the first computer-executable instructions to:

determine second intermediate data based on the second training input image data and using a third portion of the first network;

determine, based on the second intermediate data and the second training feature data, a fourth loss value using a third loss function;

determine, based on the second training input image data and using a fourth portion of the first network, third representation data;

determine, based on the third representation data and the associated label data, a fifth loss value using a fourth loss function;

determine a third weight associated with the fourth loss value;

determine a fourth weight associated with the fifth loss value; and determine the third loss value further based on the fourth loss value, the third weight, the fifth loss value, and the fourth weight.

8. A system comprising:

one or more memory devices storing first computer-executable instructions; and one or more hardware processors to execute the first computer-executable instructions to:

determine trained model data, wherein:

the trained model data is associated with first training feature data corresponding to two or more types of features of an object depicted in first training input image data, the trained model data is associated with operation of multiple portions of a first machine learning network ("first network"), and the trained model data is based on:

a first loss value that is associated with first intermediate data that corresponds to the two or more types of features of the object, a second loss value that is associated with first representation data that is based on the first training input image data, and a third loss value that is based at least on the first loss value and the second loss value;

receive first input image data;

determine second representation data, based on using the first network and the trained model data to process the first input image data;

determine enrolled user data comprising previously stored representation data that is associated with identification data; and determine asserted identification data based on a comparison of the second representation data and the previously stored representation data.

9. The system of claim 8, the one or more hardware processors to further execute the first computer-executable instructions to:

determine a first set of training data comprising the first training input image data, the first training feature data, and associated label data;

provide the first training input image data as input to the first network;

determine, based on the first training input image data and using a first portion of the first network, the first intermediate data;

determine, based on the first intermediate data and the first training feature data, the first loss value using a first loss function;

determine, based on the first training input image data and using a second portion of the first network, the first representation data;

determine, based on the first representation data and the associated label data, the second loss value using a second loss function;

determine a first weight associated with the first loss value;

determine a second weight associated with the second loss value;

determine the third loss value based on the first loss value, the first weight, the second loss value, and the second weight; and determine the trained model data based at least in part on the third loss value, wherein the trained model data is associated with operation of the first portion and the second portion of the first network.

10. The system of claim 8, the one or more hardware processors to further execute the first computer-executable instructions to:

determine a first set of training data comprising the first training input image data, the first training feature data, and associated label data;

provide the first training input image data and the first training feature data as input to the first network;

determine, based on the first training input image data and the first training feature data and using the first network, the first representation data;

determine, based on the the first representation data and the associated label data, the second loss value using a loss function; and determine the trained model data based at least in part on the second loss value, wherein the trained model data is associated with operation of the first network.

11. The system of claim 10, the one or more hardware processors to further execute the first computer-executable instructions to:

determine, using the first input image data as input to a first feature extraction module, first feature data; and determine the second representation data, further based on using the first network and the trained model data to process the first feature data.

12. The system of claim 8, the one or more hardware processors to further execute the first computer-executable instructions to:

determine a first set of training data comprising the first training input image data, the first training feature data, and associated label data;

provide the first training input image data and the first training feature data as input to the first network;

determine, based on the first training input image data and the first training feature data and using a first portion of the first network, the first intermediate data;

determine, based on the first intermediate data and the first training feature data, the first loss value using a first loss function;

determine, based on the first training input image data and the first training feature data and using a second portion of the first network, the first representation data;

determine, based on the first representation data and the associated label data, the second loss value using a second loss function;

determine a first weight associated with the first loss value;

determine a second weight associated with the second loss value;

determine the third loss value based on the first loss value, the first weight, the second loss value, and the second weight; and determine the trained model data based at least in part on the third loss value, wherein the trained model data is associated with operation of the first portion and the second portion of the first network.

13. The system of claim 12, the one or more hardware processors to further execute the first computer-executable instructions to:

determine, using the first input image data as input to a first feature extraction module, first feature data; and determine the second representation data, further based on using the first network and the trained model data to process the first feature data.

14. The system of claim 8, wherein the first input image data is representative of one or more of:

skin friction ridges of a hand, principal lines of the hand, creases of the hand, wrinkles of skin of the hand, veins of the hand, or shape of the hand.

15. The system of claim 8, wherein the first input image data comprises a first image acquired using a first modality and a second image acquired using a second modality.

16. A method comprising:

determining a first set of training data comprising first training input image data, associated first training feature data, and associated label data, wherein:

the associated first training feature data comprises at least:

first information associated with a first type of feature of an object depicted in the first training input image data, and second information associated with a second type of feature of the object depicted in the first training input image data;

providing the first training input image data as input to a first machine learning network ("first network");

determining, based on the first training input image data and using a first portion of the first network, first intermediate data, wherein the first intermediate data corresponds to respective types of feature data;

determining, based on the first intermediate data and the associated first training feature data, a first loss value using a first loss function;

determining, based on the first training input image data and using a second portion of the first network, first representation data;

determining, based on the first representation data and the associated label data, a second loss value using a second loss function;

determining a first weight associated with the first loss value;

determining a second weight associated with the second loss value;

determining a third loss value based on the first loss value, the first weight, the second loss value, and the second weight;

determining trained model data based at least in part on the third loss value, wherein the trained model data is associated with operation of the first portion and the second portion of the first network;

acquiring second input image data; and determining second representation data, based on using the first network and the trained model data to process the second input image data.

17. The method of claim 16, wherein the associated first training feature data and the first intermediate data are representative of one or more of:

skin friction ridges of a hand, principal lines of the hand, creases of the hand, wrinkles of skin of the hand, or veins of the hand.

18. The method of claim 16, further comprising:

determining enrolled user data comprising previously stored representation data that is associated with identification data; and determining asserted identification data based on a comparison of the second representation data and the previously stored representation data.

19. The method of claim 16, further comprising:

providing the associated first training feature data as input to the first network;

wherein the determining the first intermediate data by the first portion of the first network is further based on the associated first training feature data; and wherein the determining the first representation data by the second portion of the first network is further based on the associated first training feature data.

20. The method of claim 16, wherein the first training input image data and the associated first training feature data are associated with a first modality; and the first set of training data further comprising:

second training input image data associated with a second modality; and second training feature data associated with the second modality;

determining, based on the second training input image data and using a third portion of the first network, second intermediate data;

determining, based on the second intermediate data and the second training feature data, a fourth loss value using a third loss function;

determining, based on the second training input image data and using a fourth portion of the first network, third representation data;

determining, based on the third representation data and the associated label data, a fifth loss value using a fourth loss function;

determining a third weight associated with the fourth loss value;

determining a fourth weight associated with the fifth loss value; and determining the third loss value further based on the fourth loss value, the third weight, the fifth loss value, and the fourth weight.

\* \* \* \* \*